(12) United States Patent
Chen et al.

(10) Patent No.: US 11,763,473 B2
(45) Date of Patent: Sep. 19, 2023

(54) MULTI-LINE LASER THREE-DIMENSIONAL IMAGING METHOD AND SYSTEM BASED ON RANDOM LATTICE

(71) Applicant: ZHEJIANG HANCHINE AI TECH. CO., LTD., Zhejiang (CN)

(72) Inventors: Gui Chen, Zhejiang (CN); Qin Li, Zhejiang (CN)

(73) Assignee: Zhejiang Hanchine AI Tech. Co., Ltd., Zhejiang (CN)

( * ) Notice: Subject to any disclaimer, the term of this patent is extended or adjusted under 35 U.S.C. 154(b) by 234 days.

(21) Appl. No.: 17/389,828

(22) Filed: Jul. 30, 2021

(65) Prior Publication Data
US 2022/0028098 A1 Jan. 27, 2022

Related U.S. Application Data

(63) Continuation of application No. PCT/CN2021/079161, filed on Mar. 4, 2021.

(30) Foreign Application Priority Data

Jul. 23, 2020 (CN) .......................... 202010719282.6

(51) Int. Cl.
*G06T 7/521* (2017.01)
*G01B 11/25* (2006.01)
(Continued)

(52) U.S. Cl.
CPC .......... *G06T 7/521* (2017.01); *G01B 11/2513* (2013.01); *G01B 11/2518* (2013.01);
(Continued)

(58) Field of Classification Search
CPC ............. G06T 7/521; G06T 7/55; G06T 7/74; G06T 2207/10028; G06T 2207/20224;
(Continued)

(56) References Cited

U.S. PATENT DOCUMENTS

| 10,282,855 B2* | 5/2019 | Stigwall | ............... G01B 11/005 |
| 2018/0180408 A1 | 6/2018 | Du et al. | |
| 2018/0321383 A1* | 11/2018 | Heidemann | .......... H04N 13/296 |

FOREIGN PATENT DOCUMENTS

| CN | 102589476 A | 7/2012 |
| CN | 105203046 A | 12/2015 |

(Continued)

*Primary Examiner* — Susan E. Torgerson
(74) *Attorney, Agent, or Firm* — Craft Chu PLLC; Andrew W. Chu

(57) ABSTRACT

The multi-line laser three-dimensional imaging method and system is based on a random lattice. A multi-line laser is used and combined with a rotating mechanism to realize a large-view-field rapid scanning effect, such that the working efficiency is improved by orders of magnitude, and the deployment difficulty of the system is reduced. Due to the fact that within an imaging range, pattern features of the random lattice of each local area have uniqueness, a plurality of laser lines are extracted, position sequence numbers are distinguished, and noise points are reduced through mutual verification of the pattern features of the random lattice between adjacent images, such that the quality of three-dimensional point cloud data is greatly improved. The method and the system can be applied to industrial applications, such as disorderly grabbing, feeding and discharging, unstacking and stacking, logistics sorting and the like.

12 Claims, 3 Drawing Sheets

(51) Int. Cl.
*G06T 7/70* (2017.01)
*G06T 7/55* (2017.01)
*H04N 13/296* (2018.01)
*H04N 13/254* (2018.01)
*H04N 13/239* (2018.01)
*G06T 7/73* (2017.01)
*G06F 18/22* (2023.01)

(52) U.S. Cl.
CPC .......... *G01B 11/2545* (2013.01); *G06F 18/22* (2023.01); *G06T 7/55* (2017.01); *G06T 7/74* (2017.01); *H04N 13/239* (2018.05); *H04N 13/254* (2018.05); *H04N 13/296* (2018.05); *G06T 2207/10028* (2013.01)

(58) Field of Classification Search
CPC ............ G01B 11/2513; G01B 11/2518; G01B 11/2545; G06F 18/22; H04N 13/239; H04N 13/254; H04N 13/296; H04N 23/56; H04N 23/60
USPC ......................................................... 348/47
See application file for complete search history.

(56) References Cited

FOREIGN PATENT DOCUMENTS

| | | |
|---|---|---|
| CN | 107578464 A | 1/2018 |
| CN | 108375346 B | 8/2018 |
| CN | 110866924 A | 3/2020 |
| WO | 2013/184340 A1 | 12/2013 |

* cited by examiner

MULTI-LINE LASER THREE-DIMENSIONAL IMAGING METHOD AND SYSTEM BASED ON RANDOM LATTICE

CROSS-REFERENCE TO RELATED APPLICATIONS

The present application claims priority under 35 U.S.C. Section 120 from U.S. Patent Application Serial No. PCT/CN21/079161 on 4 Mar. 2021, entitled "MULTI-LINE LASER THREE-DIMENSIONAL IMAGING METHOD AND SYSTEM BASED ON RANDOM LATTICE".

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present disclosure relates to the field of 3D machine vision technologies, and more particularly, to a multi-line laser three-dimensional imaging method and system based on a random lattice.

2. Description of Related Art Including Information Disclosed Under 37 CFR 1.97 and 37 CFR 1.98

With the development of robot technologies, industrial robots have participated in all aspects of industrial manufacturing and production, and have become an indispensable role in the process of factory automation and intelligence. When facing some simple application scenarios such as orderly feeding of machining, robots can be programmed to achieve automation to replace manual labor. However, when facing complex and disorderly scenarios, three-dimensional imaging systems are required to be used as "eyes" to endow the robots with more product spatial position information, such that automation of such industrial applications as disorderly feeding and discharging, unstacking and stacking, logistics sorting and the like can be implemented.

The three-dimensional imaging systems based on LED structured light are widely used because of their characteristics of high imaging accuracy and fast speed. However, in the case of large-view-field imaging, data quality is severely reduced due to insufficient brightness and lower contrast of an LED light source. Furthermore, mobile modules or a plurality of systems connected in parallel need to be additionally provided to achieve a large scanning range, which not only increases system costs, but also reduces scanning frame rate. Laser is also used for structured light three-dimensional imaging due to its high brightness and high contrast. Although the three-dimensional imaging systems based on single-line laser are mature in application, they can only obtain data in one line and thus cannot achieve coverage of imaging range without mobile modules or rotating mechanisms, thereby resulting in low working efficiency.

In the Chinese Patent with a publishing No. CN108375346B, a microgalvanometer can also be used to achieve the area array scanning effect, wherein rotation of a dual-axis microgalvanometer is used to implement the area array scanning effect of a point laser, which, however, cannot be achieved without high-precision design, processing and assembly of optical components and thus is relatively complicated in structural implementation. Furthermore, this implementation manner may greatly reduce the output power of the laser light source, which is generally less than 100 MW, and thus it can only be applied to application scenarios smaller in field of view and lower in brightness. In the Chinese Patent with a publishing No. CN1052030046A, multi-line array laser is employed to achieve three-dimensional scanning. That is, a plurality of lasers are arranged in parallel to form a laser array module to increase the scanning rate. However, a mobile mechanism is required to move the scanning system composed of the laser array module to the next scanning plane. The scanning system can also achieve the effect of intra-area area array scanning, but it still has a low scanning efficiency, which can only be used for offline three-dimensional scanning at present.

Although the three-dimensional imaging system based on multi-line laser can solve the problem of low efficiency, it cannot accurately recognize and locate laser line sequences when a height of a scanned object is greater than a pitch between the laser lines, resulting in the problem of incorrect settlement of spatial position information. That is, the denser the laser lines are, the greater the settlement error probability becomes, and the more the data noise is caused. Relevant scholars have realized three-dimensional imaging using a structured light source based on random lattice and multi-line laser, the system of which is characterized in keeping the structured light source still and moving the object to be tested by a mobile mechanism with respect to the structured light source to achieve the area array scanning effect. The system also has a low scanning efficiency, and it requires an external mobile mechanism. In addition, this scanning system uses a single imaging unit only, raising higher requirements for system calibration, leading to difficult calibration and low calibration accuracy, and thus the accuracy of the point cloud after three-dimensional reconstruction is poor. Furthermore, in the case of locating the laser line sequences, it is impossible to perform secondary matching verification after the laser line sequences are located due to the lack of constraint conditions, which may cause more mismatched locations and eventually obtain some noise points, lowering quality of the point cloud data.

In general, the existing three-dimensional scanning systems based on multi-line laser have problems such as complicated system, insufficient output power of the structured light source and low industrial adaptability. Furthermore, in the aspect of a three-dimensional reconstruction algorithm, the existing three-dimensional scanning systems based on multi-line laser also have a problem of causing noise points due to matching and localization errors of the laser line sequences.

BRIEF SUMMARY OF THE INVENTION

In view of the above problems, the present disclosure provides a multi-line laser three-dimensional imaging method and system based on a random lattice, which can accurately locate and distinguish laser line sequences, reduce data noise, and improve data accuracy.

A multi-line laser three-dimensional imaging method based on a random lattice includes the following steps.

In Step (1), a random lattice pattern is projected on a surface of an object by using a random lattice laser light source, and image capture is performed on the object to obtain a background image containing a lattice pattern.

In Step (2), on a basis of irradiation of the random lattice laser light source, laser light emitted from a multi-line laser light source is reflected onto a surface of the object by a high-reflection mirror, and the high-reflection mirror is controlled to rotate at a certain speed to allow laser lines to pan and scan on the surface of the object to successively capture, in the scanning process, n object images $P_1$, $P_2$, ..., and $P_n$ containing the lattice pattern and the laser lines, wherein $P_1$ serves as a reference image, n represents a natural number and n≤L/W, L represents a pitch between the laser lines, and W represents a width of the laser line.

In Step (3), sub-pixel extraction is performed on the laser lines in all the object images.

In Step (4), a line sequence position of each of the laser lines in the object images $P_2$, ..., and $P_n$ is determined by performing area-based matching with the reference image.

In Step (5), point cloud data are generated by calculation with a triangulation measurement principle according to sub-pixel coordinates of each point on the laser line whose line sequence position is determined in the object images $P_1$, $P_2$, ..., and $P_n$, such that three-dimensional reconstruction is performed on the object.

Further, the Step (3) is implemented specifically with the following steps.

In Step 3.1, for any one of the object images, the laser line in the object image is recognized by means of grayscale difference comparison.

In Step 3.2, for any point P on the laser line whose coordinates in the image are (x, y), a normal direction ($n_x$, $n_y$) of a light ray at the point P is obtained through a Hessian matrix.

In Step 3.3, sub-pixel coordinates ($P_x$, $P_y$) of the point P are calculated through following formulas by taking a point ($x_0$, $y_0$) as a reference point:

$$P_x = x_0 + t \times n_x$$
$$P_y = y_0 + t \times n_y$$
$$t = -\frac{n_x r_x + n_y r_y}{n_x^2 r_{xx} + 2n_x n_y + n_y^2 r_{yy}}$$
$$H(x, y) = \begin{bmatrix} r_{xx} & r_{xy} \\ r_{xy} & r_{yy} \end{bmatrix}$$

wherein H(x,y) represents the Hessian matrix of the point P, $r_{xx}$ represents a second-order partial derivative of the point P in the image along an X axis, $r_x$ represents a first-order partial derivative of the point P in the image along the X axis, $r_{yy}$ represents a second-order partial derivative of the point P in the image along a Y axis, $r_y$ represents a first-order partial derivative of the point P in the image along the Y axis, and $r_{xy}$ represents a second-order mixed partial derivative of the point P in the image along the X axis and the Y axis.

Further, in the Step 3.1, a grayscale difference calculation is performed on the object image and the background image, and the laser line in the object image is recognized according to the grayscale difference.

Further, the normal direction ($n_x$, $n_y$) in the Step 3.2 is a normal direction of the light ray corresponding to a feature vector corresponding to a maximum eigenvalue of the Hessian matrix $H(x_0, y_0)$.

Further, the Step (4) is implemented specifically by the following steps.

In Step 4.1, a certain number of matching points are selected from the reference image, and the laser lines in the reference image are numbered according to position sequence.

In Step 4.2, for any one of the matching points, an area D having a size of N×N is created taking this point as a center, wherein the N represents a natural number greater than 1.

In Step 4.3, for any one of the object images $P_2$, ..., and $P_n$, areas having the same size of N×N are created in a parallax range of the image along an epipolar line, and similarity matching is performed between the area D and the areas one by one to determine an area having a maximum similarity.

In Step 4.4, all the matching points are traversed according to the Steps 4.2 and 4.3, and the laser lines corresponding to sequence numbers in the reference images are searched for by means of area-based matching, to locate the laser lines in the object images $P_2$, ..., and $P_n$ and mark the sequence numbers of the laser lines.

Further, in the Step 4.3, similarity matching is performed on the areas using a winner take all (WTA) principle, and a normalized cross correlation (NCC) similarity measurement function is used as a similarity evaluation index.

Further, after determining a line sequence position of each of the laser lines in the object images $P_2$, ..., and $P_n$ in the Step (4), mutual verification is performed through information of laser lines in adjacent images according to a characteristic that the adjacent images have the same random lattice information.

A multi-line laser three-dimensional imaging system based on a random lattice includes a random lattice laser light source, a multi-line laser light source, a high-reflection mirror, a rotating mechanism, an image capture unit, a core control unit, and a data processing unit, wherein the random lattice laser light source is configured to project a random lattice pattern on a surface of an object;

laser light emitted from the multi-line laser light source is reflected by the high-reflection mirror to the surface of the object, and an emission center of the light source coincides with a center of the high-reflection mirror and the number of laser beams emitted is greater than or equal to 3;

the rotating mechanism is configured to drive the high-reflection mirror to rotate at a certain speed, such that laser lines pan and scan on the surface of the object;

the image capture unit is configured to capture images of the object to obtain a background image containing a lattice pattern and object images $P_1$, $P_2$, ..., and $P_n$ containing lattice patterns and laser lines, the image capture unit including at least one imaging unit, wherein an optical axis center of the imaging unit is on the same plane as the emission center of the multi-line laser light source;

the core control unit includes a power management module, a communication module, and a control module, the power management module being configured to supply power to the system, the communication module being configured to support communications between other functional components in the system and the data processing unit, and the control module being configured to control laser projection of the random lattice laser light source and the multi-line laser light source, and to control the rotating mechanism to rotate to drive the high-reflection mirror to rotate at a certain speed; and the data processing unit is configured to perform sub-pixel extraction on the laser lines in all the object images, to determine a line sequence position of each of the laser lines in the object images $P_2, \ldots,$ and $P_n$ by area-based matching, and to generate point cloud data by calculation with a triangulation measurement principle according to sub-pixel coordinates of each point on the laser line whose line sequence position is determined in the object images $P_1, P_2, \ldots,$ and $P_n$, such that three-dimensional reconstruction is performed on the object.

In the present disclosure, the rotating mechanism with the high-reflection mirror is employed to simultaneously pan and scan with a plurality of laser lines to achieve light projection effects of an area array structure. Based on a difference calculation with respect to the background image, sub-pixel coordinates of a center of a laser line stripe in each image are obtained using the Hessian matrix. Determination of the matching points is achieved based on regional similarity measurement, the extracted laser lines are located and distinguished by means of random lattice features of the laser line fringe, and then point cloud data of the entire object plane are obtained by the calculation with the triangulation measurement principle. Therefore, the present disclosure solves the problem of excessive noise points triggered by settlement errors caused when the pitch between the laser lines is smaller than the height of the object. Furthermore, based on the movement of the rotating mechanism, the multi-line laser can quickly scan on the surface of the object, and thus the imaging speed is greatly improved.

Compared with conventional methods, in the present disclosure, multi-line laser is used and combined with the rotating mechanism to realize a large-view-field rapid scanning effect, such that the working efficiency is improved by orders of magnitude, and the deployment difficulty of the system is reduced. Furthermore, due to the fact that within an imaging range, pattern features of the random lattice of each local area have uniqueness, a plurality of laser lines are extracted and position sequence numbers are distinguished, and noise points are reduced through mutual verification of the pattern features of the random lattice between adjacent images, such that the quality of three-dimensional point cloud data is greatly improved, and the method can be applied to industrial applications such as disorderly grabbing, feeding and discharging, unstacking and stacking, logistics sorting and the like.

BRIEF DESCRIPTION OF THE SEVERAL VIEWS OF THE DRAWINGS

To describe the technical solutions of the embodiments of the present disclosure or that of the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION OF THE INVENTION

To make a person skilled in the art better understand the solutions of the present disclosure, technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by those of ordinary skills in the art based on the embodiments of the present disclosure without creative efforts shall fall within the protection scope of the present disclosure.

It should be explained that in the description, the claims and the foregoing accompanying drawings of the present disclosure, a term (such as a first ora second . . . ) is intended to separate between similar objects but is not intended to describe a specific sequence or precedence order. It is to be understood that data used like this may be interchangeable where appropriate, so as to describe the embodiments of the present disclosure herein. Furthermore, terms such as "comprise", "have" or other variants thereof are intended to cover a non-exclusive "comprise", for example, processes, methods, systems, products or devices comprising a series of steps or units are not limited to these steps or units listed explicitly, but comprise other steps or units not listed explicitly, or other steps or units inherent to these processes, methods, systems, products or devices.

In the present disclosure, terms "mounted", "arranged", "provided with", "connection", "connected" or "sleeved" should be understood in a broad sense, which may be, for example, a fixed connection, a detachable connection or integrated connection, a mechanical connection or an electrical connection, a direct connection or indirect connection by means of an intermediary, or an internal communication between two devices, components or constituent parts. For those of ordinary skill in the art, specific meanings of the above terms in the present disclosure may be understood based on specific circumstances.

It is to be noted that the embodiments in the present disclosure and the features in the embodiments may be combined with each other on a non-conflict basis.

The present disclosure will be described below in detail with reference to the accompanying drawings and in combination with the embodiments.

Figure 1:
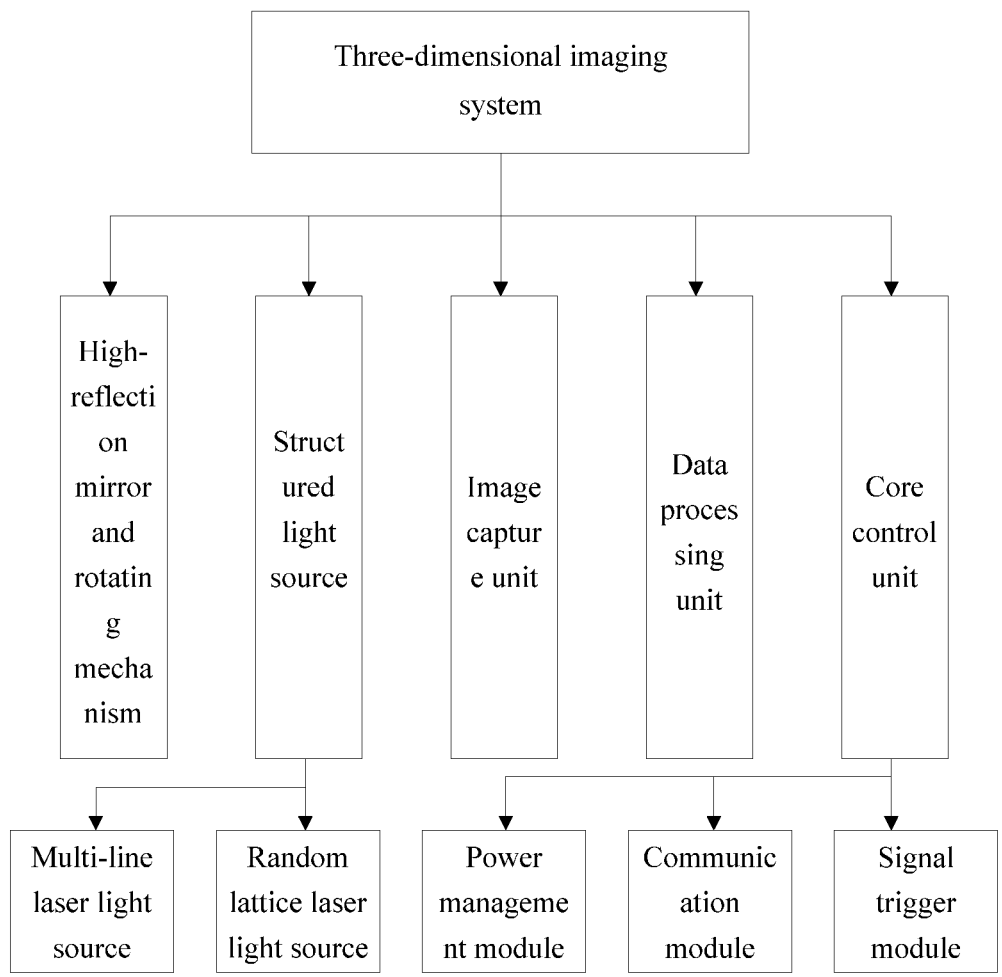
FIG. 1 is a schematic view of a composition diagram of a three-dimensional imaging system according to the present disclosure.

As shown in FIG. 1, the present disclosure provides a multi-line laser three-dimensional imaging system based on a random lattice, which mainly includes a structured light source, an image capture unit, a data processing unit, a core control unit, a high-reflection mirror, and a rotating mechanism. The structured light source includes a multi-line laser light source and a random lattice laser light source configured to locate laser beams.

Figure 3:
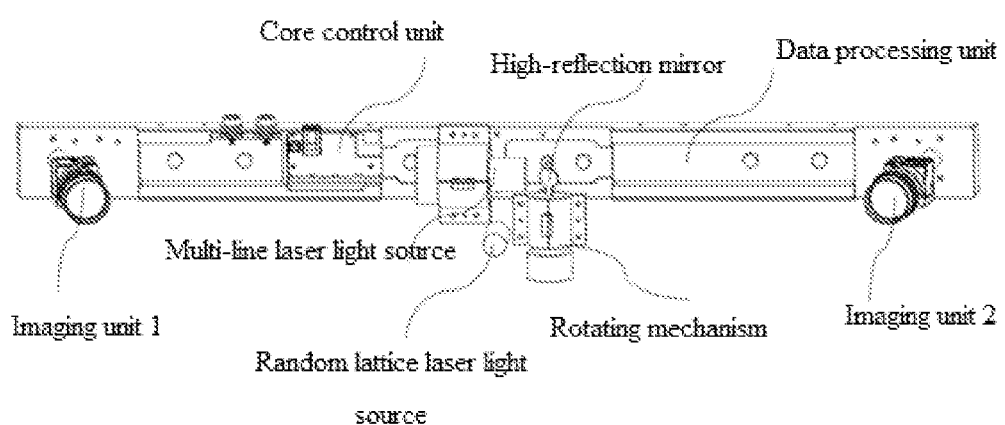
FIG. 3 is a schematic view of a structural diagram of the three-dimensional imaging system according to a specific embodiment of the present disclosure.

As shown in FIG. 3, the image capture unit in this embodiment is composed of an imaging unit 1 and an imaging unit 2. The imaging units may be a camera module, an industrial camera, a digital camera or the like, which have multiple pixel resolutions. In actual applications, the number of the imaging units is m≥1, and it is preferred to provide two imaging units as shown in FIG. 3. Optical axis centers of the imaging unit 1 and the imaging unit 2 need to be on the same plane as a projection center of the laser light source.

The high-reflection mirror is fixed on the rotating mechanism to form an independent module. The core control unit is programmable to drive the high-reflection mirror to rotate at a certain speed to allow the laser lines to pan and scan on the surface of the object. Initial position and rotation speed of the high-reflection mirror are controlled by the core control unit. In the scanning process, the imaging units may be triggered at a fixed pitch to synchronously capture the images.

The random lattice laser light source is controlled by the core control unit and is configured to project a random lattice pattern on the surface of the object.

Figure 2:
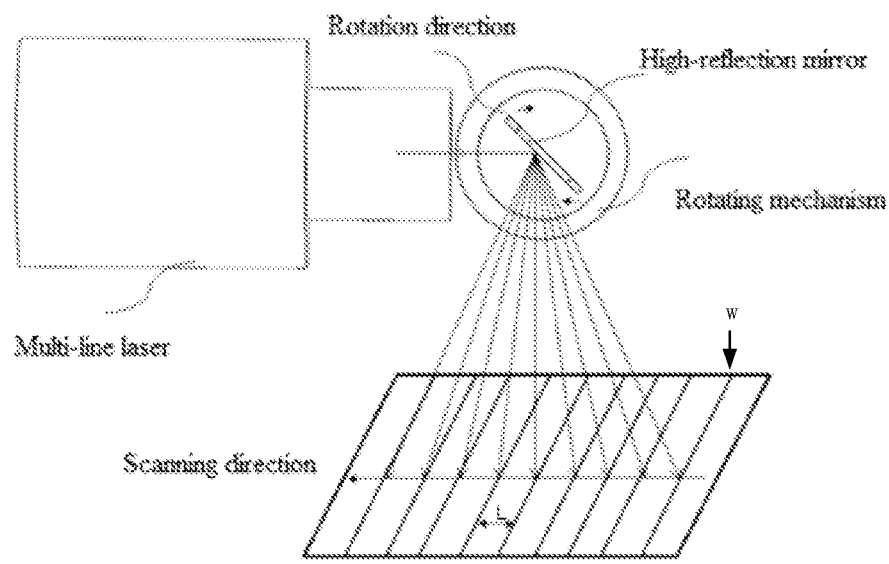
FIG. 2 is a schematic view of a diagram of multi-line area array scanning principle of the three-dimensional imaging system according to the present disclosure.

The multi-line laser light source is reflected by the high-reflection mirror to the surface of the object, and the multi-line laser scans on the surface of the object by controlling the rotation of the rotating mechanism. As shown in FIG. 2, the center of the light source should coincide with that of the high-reflection mirror, and the light source may be a module composed of a plurality of word lines connected in parallel, or also may be a laser module provided with a plurality of straight lines and obtained by optical diffraction, wherein the number of lines p≥3.

The core control unit includes a power management module, a communication module and a signal trigger module of the three-dimensional imaging system. The power management module is configured to supply power to the modules of the system, the communication module is configured to support communications between the modules and the data processing unit, and the signal trigger module is configured to output work instructions to the modules.

The data processing unit is configured to receive and process image data containing laser stripes and random lattices obtained by calculation to finally obtain point cloud data. Specifically, corresponding to subsequent method embodiments, the data processing unit is configured to perform sub-pixel extraction on the laser lines in all the object images, to determine a line sequence position of each of the laser lines in the object images $P_2, \ldots,$ and $P_n$ by area-based matching, and to generate point cloud data by calculation with a triangulation measurement principle according to sub-pixel coordinates of each point on the laser line whose line sequence position is determined in the object images $P_1, P_2, \ldots,$ and $P_n$, such that three-dimensional reconstruction is performed on the object.

The embodiments of the present disclosure provide a multi-line laser three-dimensional imaging method based on a random lattice, which includes the following steps.

In Step (1), a random lattice pattern is projected on a surface of an object by using the random lattice laser light source (this is specifically implemented by controlling the core control unit), and image capture is performed on the object to obtain a background image containing a lattice pattern. The specific image capture is implemented by the image capture unit in the above embodiments. The number of the image capture units is m≥1.

In Step (2), on the basis of irradiation of the random lattice laser light source, laser light emitted from a multi-line laser light source is reflected onto a surface of the object by a high-reflection mirror, and the high-reflection mirror is controlled (the high-reflection mirror is controlled by controlling a rotating mechanism) to rotate at a certain speed to allow laser lines to pan and scan on the surface of the object to successively capture, in the scanning process, n object images $P_1, P_2, \ldots,$ and $P_n$ containing the lattice pattern and the laser lines, wherein $P_1$ serves as a reference image, n represents a natural number and n≥L/W, L represents a pitch between the laser lines, and W represents a width of the laser line. Preferably, n=L/W.

In Step (3), sub-pixel extraction is performed on the laser lines in all the object images.

The Step (3) is implemented specifically with the following steps.

In Step 3.1, for any one of the object images, the laser line in the object image is recognized by means of grayscale difference comparison.

In the Step 3.1, a grayscale difference calculation is performed on the object image and the background image, and the laser line in the object image is recognized according to the grayscale difference.

In Step 3.2, for any point P on the laser line whose coordinates in the image are (x, y), a normal direction ($n_x$, $n_y$) of a light ray at the point P is obtained through a Hessian matrix. The normal direction ($n_x$, $n_y$) is a normal direction of the light ray corresponding to a feature vector corresponding to a maximum eigenvalue of the Hessian matrix H(x, y).

In Step 3.3, sub-pixel coordinates ($P_x$, $P_y$) of the point P are calculated through following formulas by taking a point ($x_0$, $y_0$) as a reference point:

$$P_x = x_0 + t \times n_x$$

$$P_y = y_0 + t \times n_y$$

$$t = -\frac{n_x r_x + n_y r_y}{n_x^2 r_{xx} + 2 n_x n_y + n_y^2 r_{yy}}$$

$$H(x, y) = \begin{bmatrix} r_{xx} & r_{xy} \\ r_{xy} & r_{yy} \end{bmatrix}$$

wherein H(x,y) represents the Hessian matrix of the point P, $r_{xx}$ represents a second-order partial derivative of the point P in the image along an X axis, $r_x$ represents a first-order partial derivative of the point P in the image along the X axis, $r_{yy}$ represents a second-order partial derivative of the point P in the image along a Y axis, $r_y$ represents a first-order partial derivative of the point P in the image along the Y axis, and $r_{xy}$ represents a second-order mixed partial derivative of the point P in the image along the X axis and the Y axis.

In Step (4), a line sequence position of each of the laser lines in the object images $P_2, \ldots,$ and $P_n$ is determined by performing area-based matching with the reference image.

The Step (4) is implemented specifically with the following steps.

In Step 4.1, a certain number of matching points are selected from the reference image, and the laser lines in the reference image are numbered according to position sequence.

In Step 4.2, for any one of the matching points, an area D having a size of N×N is created taking this point as a center, wherein the N represents a natural number greater than 1.

In Step 4.3, for any one of the object images $P_2, \ldots,$ and $P_n$, areas having the same size of N×N are created in a parallax range of the image along an epipolar line, and similarity matching is performed between the area D and the areas one by one to determine an area having a maximum similarity. Similarity matching is performed on the areas using a WTA principle, and an NCC similarity measurement function is used as a similarity evaluation index.

In Step 4.4, all the matching points are traversed according to the Steps 4.2 and 4.3, and the laser lines corresponding to sequence numbers in the reference image are searched for by means of area-based matching, to locate the laser lines in the object images $P_2, \ldots,$ and $P_n$ and mark the sequence numbers of the laser lines.

In Step (5), point cloud data are generated by calculation with a triangulation measurement principle according to sub-pixel coordinates of each point on the laser line whose line sequence position is determined in the object images $P_1$, $P_2, \ldots,$ and $P_n$, such that three-dimensional reconstruction is performed on the object.

Further, after determining a line sequence position of each of the laser lines in the object images $P_2, \ldots,$ and $P_n$ in the Step (4), mutual verification is performed through information of laser lines in adjacent images according to a characteristic that the adjacent images have the same random lattice information.

In this embodiment, as a preferred solution, the multi-line laser three-dimensional imaging method based on a random lattice is described in detail by taking an example where laser beams p=7, laser line pitch L=200 mm, laser line width W=2 mm, and the number of imaging units m=2.

Figure 4:
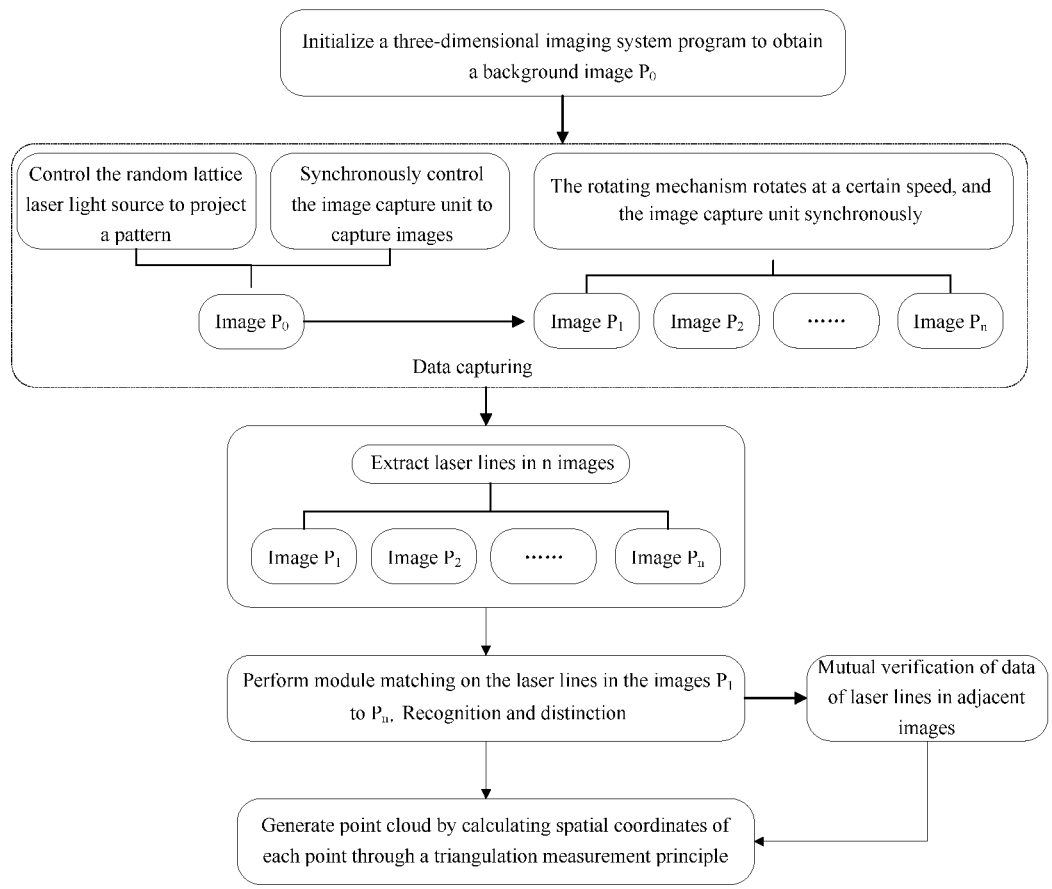
FIG. 4 is a schematic view of a flow diagram of a three-dimensional imaging method according to the present disclosure.

As shown in FIG. 4, detailed processes of the three-dimensional imaging method are described as below.

(1) First, the core control unit controls the random lattice laser light source to project to the surface of the object, and meanwhile triggers the imaging unit 1 and the imaging unit 2 to capture background images $P_{OL}$ and $P_{OR}$.

The multi-line laser light source is controlled to project laser light to the high-reflection mirror, and the laser light is reflected to the surface of the object. At the same time, the imaging unit 1 and the imaging unit 2 are triggered to capture reference images P1L and P1R. Next, the rotating mechanism is controlled to rotate at a certain speed, and the imaging unit 1 and the imaging unit 2 are triggered at a fixed pitch to synchronously capture n images respectively, which are $P_{2L}, P_{3L}, \ldots, P_{nL}$; and $P_{2R}, P_{3R}, \ldots, P_{nR}$, where n=L/W. It is to be noted that n=L/W is a preferred solution.

(2) Laser line extraction is performed on the reference image $P_{1L}$. First, a grayscale difference calculation and analysis is performed on the reference image and the background image. A grayscale value of any pixel in the image containing laser stripes may be expressed as $\Delta(P_x, P_y)=F(P_x, P_y)-B(P_x, P_y)$, where $F(P_x, P_y)$ represents the grayscale value of the image containing the laser stripes, and $B(P_x, P_y)$ represents the grayscale value of the background image.

Next, a normal direction of a light ray at any point P(x, y) on the laser stripe is obtained through a Hessian matrix. A feature vector corresponding to a maximum eigenvalue of the Hessian matrix corresponds to the normal direction of the light ray and may be expressed as $(n_x, n_y)$. Taking a point $(x_0, y_0)$ as a reference point, the sub-pixel coordinates of the center of this point are as below:

$$(P_x, P_y) = (x_0 + t \times n_x, y_0 + t \times n_y)$$

wherein $$t = -\frac{n_x r_x + n_y r_y}{n_x^2 r_{xx} + 2 n_x n_y r_{xy} + n_y^2 r_{yy}}, H(x, y) = \begin{bmatrix} r_{xx} & r_{xy} \\ r_{xy} & r_{yy} \end{bmatrix},$$

$r_{xx}$ represents a second-order partial derivative of the point P in the image along an X axis, $r_x$ represents a first-order partial derivative of the point P in the image along the X axis, $r_{yy}$ represents a second-order partial derivative of the point P in the image along a Y axis, $r_y$ represents a first-order partial derivative of the point P in the image along the Y axis, and $r_{xy}$ represents a second-order mixed partial derivative of the point P in the image along the X axis and the Y axis.

The same method is employed to extract the laser lines for other images.

(3) An area having a size of N×N is created by taking a to-be-matched point of the reference image $P_{1L}$ as a center pixel, and similarity matching is performed between the reference image $P_{1L}$ and the images $P_{2L}, P_{3L}, \ldots,$ and $P_{nL}$ captured by the imaging unit 1. Areas having the same size of N×N are selected in a parallax range along an epipolar line to make a comparison with the area of the to-be-matched point successively to determine the final matching point according to the WTA principle. The similarity measurement function may be expressed as:

$$NCC = \frac{\sum_{u,v}(I_1(u,v) - \overline{I_1}) \cdot (I_2(u+d,v) - \overline{I_2})}{\sqrt{\sum_{u,v}(I_1(u,v) - \overline{I_1})^2} \cdot \sqrt{\sum_{u,v}(I_2(u+d,v) - \overline{I_2})^2}}$$

By using the same method, similarity matching is performed between the reference image PSR and the images $P_{2R}, P_{3R}, \ldots,$ and $P_{nR}$ captured by the imaging unit 2, and the final matching point is determined according to the WTA principle.

Figure 5:
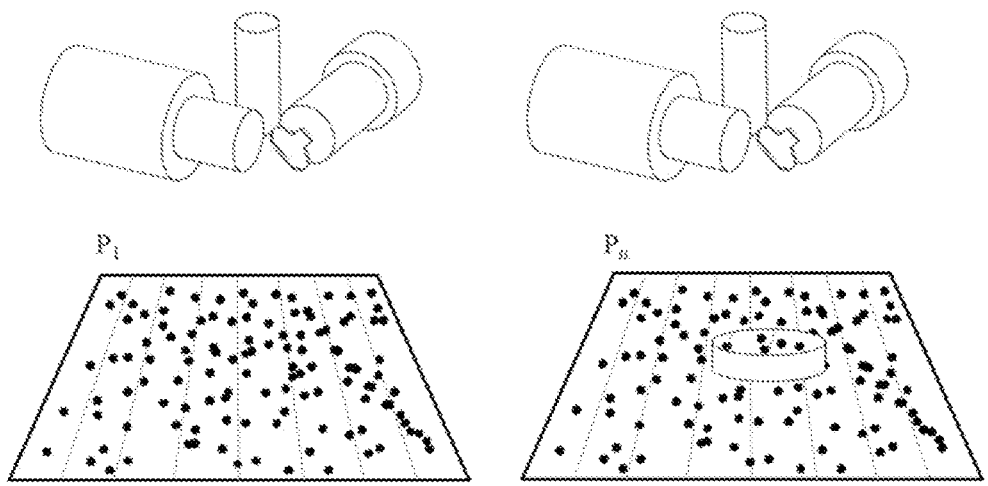
FIG. 5 is a schematic view of a diagram of distinguishing position sequence numbers of multi-line laser lines.

Pattern features of the random lattice are extracted from each N×N area of the reference image $P_{1L}$, and position sequences of the laser lines in the reference image $P_{1L}$ are marked. A feature area having a high similarity to the reference image $P_{1L}$ is searched in sequence from the images $P_{2L}, P_{3L}, \ldots,$ and $P_{nL}$ captured by the imaging unit 1. As shown in FIG. 5, each of the images contains a plurality of laser lines. By searching for sequence numbers corresponding to the laser lines in the reference image $P_{1L}$, the position sequence number of each laser line in the images $P_{2L}, P_{3L}, \ldots,$ and $P_{nL}$ is determined.

By using the same method, the position sequence numbers of the laser lines in the images $P_{2R}, P_{3R}, \ldots,$ and $P_{nR}$ captured by the imaging unit 2 and the position sequence numbers of the laser lines in the reference image are matched and determined.

After the position sequence numbers of the laser lines in the images captured by the imaging unit 1 and the imaging unit 2 are determined, verification may be performed on adjacent images. Generally, laser lines $L_i(P_n)$ and $L_{i+1}(P_{n-1})$ have the same random lattice information.

(4) Spatial coordinates of the centers of the laser stripes in all the images captured by the imaging unit 1 and the imaging unit 2 are calculated according to the triangulation measurement principle to finally obtain the entire point cloud data.

Line sequence positions of the laser lines in each image can be accurately determined through the verification of the adjacent images. Based on the parallax between the imaging unit 1 and the imaging unit 2 and on the triangulation measurement principle, three-dimensional reconstruction is performed on the sub-pixel coordinates ($P_x$, $P_y$) of any point on the laser line whose line sequence position is correctly determined in each of the images captured by the imaging unit 1 and the imaging unit 2. The parallax between the imaging unit 1 and the imaging unit 2 is $d=x_1-x_r$, and the spatial coordinates of the corresponding point ($P_x$, $P_y$) after the three-dimensional reconstruction are $(X, Y, Z)=f(x, y, d, Q)$, where Q represents a calibration matrix of the system.

The above descriptions of the embodiments are to facilitate those of ordinary skill in the art to understand and apply the present disclosure. Those skilled in the art may readily make various modifications of the embodiments of the present disclosure, and apply the general principle described herein to other embodiments without creative efforts. Therefore, the present disclosure is not limited to the foregoing embodiments, and all improvements and modifications made by those skilled in the art according to the present disclosure shall fall within the scope of protection of the present disclosure.

We claim:

1. A multi-line laser three-dimensional imaging method based on a random lattice, comprising following steps:
   (1) projecting a random lattice pattern on a surface of an object by using a random lattice laser light source, and performing image capture on the object to obtain an object image containing a lattice pattern $P_0$, wherein $P_0$ serves as a background image;
   (2) on basis of irradiation of the random lattice laser light source, reflecting laser light emitted from a multi-line laser light source onto the surface of the object by a high-reflection mirror, and controlling the high-reflection mirror to rotate at a certain speed to allow laser lines to pan and scan on the surface of the object to successively capture, in the scanning process, n object images $P_1, P_2, \ldots,$ and $P_n$ containing the lattice pattern and the laser lines,
   wherein $P_1$ serves as a reference image, n represents a natural number and n≥L/W, L represents a pitch between the laser lines, and W represents a width of the laser line;
   (3) performing sub-pixel extraction on the laser lines in all the object images;
   (4) determining a line sequence position of each of the laser lines in the object images $P_2, \ldots,$ and $P_n$ by performing area-based matching with the reference image; and
   (5) generating point cloud data by calculation with a triangulation measurement principle according to sub-pixel coordinates of each point on the laser line whose line sequence position is determined in the object images $P_1, P_2, \ldots,$ and $P_n$, such that three-dimensional reconstruction is performed on the object.

2. The multi-line laser three-dimensional imaging method according to claim 1, wherein the Step (3) is comprised of the steps of:
   3.1 for any one of the object images, recognizing the laser line in the object image by grayscale difference comparison,
   wherein said grayscale difference comparison is comprised of a grayscale difference calculation is performed on the object image and the background image, the laser line in the object image being recognized according to the grayscale difference comparison;
   3.2 for any point P on the laser line whose coordinates in the image are (x, y), obtaining a normal direction (nx, ny) of a light ray at the point P through a Hessian matrix, wherein the image coordinate takes the image center as the coordinate origin, wherein the X and Y axes are parallel to both sides of the image, and wherein (x, y) represents the coordinate value of object P; and
   3.3 calculating the sub-pixel coordinates ($P_x$, $P_y$) of the point P through following formulas by taking a point ($x_0$, $y_0$) as a reference point:

$$P_x = x_0 + t \times n_x$$
$$P_y = y_0 + t \times n_y$$
$$t = -\frac{n_x r_x + n_y r_y}{n_x^2 r_{xx} + 2 n_x n_y + n_y^2 r_{yy}}$$
$$H(x, y) = \begin{bmatrix} r_{xx} & r_{xy} \\ r_{xy} & r_{yy} \end{bmatrix}$$

wherein H(x,y) represents the Hessian matrix of the point P, $r_{xx}$ represents a second-order partial derivative of the point P in the image along an X axis, $r_x$ represents a first-order partial derivative of the point P in the image along the X axis, $r_{yy}$ represents a second-order partial derivative of the point P in the image along a Y axis, $r_y$ represents a first-order partial derivative of the point P in the image along the Y axis, and $r_{xy}$ represents a second-order mixed partial derivative of the point P in the image along the X axis and the Y axis.

3. The multi-line laser three-dimensional imaging method according to claim 2, wherein the Step 3.1 comprises the steps of:
   performing a grayscale difference calculation on the object image and the background image, and
   recognizing the laser line in the object image according to the grayscale difference.

4. The multi-line laser three-dimensional imaging method according to claim 2, wherein the normal direction ($n_x$, $n_y$) in the Step 3.2 is comprised of a normal direction of the light ray corresponding to a feature vector corresponding to a maximum eigenvalue of the Hessian matrix $H(x_0, y_0)$.

5. The multi-line laser three-dimensional imaging method according to claim 1, wherein the Step (4) is comprised of the steps:
   4.1 selecting a certain number of matching points from the reference image, and numbering the laser lines in the reference image according to position sequence;
   4.2 for any one of the matching points, creating an area D having a size of N×N by taking this point as a center, wherein N represents a natural number greater than 1;
   4.3 for any one of the object images $P_2, \ldots,$ and $P_n$, creating areas having the same size of N×N in a parallax range of the image along an epipolar line, and performing similarity matching between the area D and the areas one by one to determine an area having a maximum similarity; and
   4.4 traversing all the matching points according to the Steps 4.2 and 4.3, and searching for the laser lines corresponding to sequence numbers in the reference image by means of area-based matching, to locate the laser lines in the object images $P_2, \ldots,$ and $P_n$ and mark the sequence numbers of the laser lines.

6. The multi-line laser three-dimensional imaging method according to claim 5, wherein the Step 4.3 comprises the steps of:

performing similarity matching on the areas using a WTA principle, and using an NCC similarity measurement function as a similarity evaluation index, wherein the similarity measurement function may be expressed as:

$$NCC = \frac{\sum_{u,v}(I_1(u,v) - \overline{I_1}) \cdot (I_2(u+d,v) - \overline{I_2})}{\sqrt{\sum_{u,v}(I_1(u,v) - \overline{I_1})^2} \cdot \sqrt{\sum_{u,v}(I_2(u+d,v) - \overline{I_2})^2}}.$$

7. The multi-line laser three-dimensional imaging method according to claim 1, after determining a line sequence position of each of the laser lines in the object images $P_2, \ldots,$ and $P_n$ in the Step (4), the method further comprising the steps of:

performing a mutual verification through information of laser lines in adjacent images according to a characteristic that the adjacent images have same random lattice information;

extracting pattern features of the random lattice from each N×N area of the reference image $P_1$; and marking position sequences of the laser lines in the reference image $P_1$, wherein a feature area having a high similarity to the reference image $P_1$ is searched in sequence from the object images $P_2, P_3, \ldots,$ and $P_n$, wherein each of the images contains a plurality of laser lines, and wherein position sequence number of each laser line in the images is determined by searching for sequence numbers corresponding to the laser lines in the reference image $P_1$.

8. The multi-line laser three-dimensional imaging method according to claim 1, wherein said performing image capture on the object of Step (1) comprises the step of:

performing image capture through two imaging units, optical axis centers of the two imaging units being on a same plane as a projection center of the multi-line laser light source.

9. The multi-line laser three-dimensional imaging method according to claim 8, wherein the step of said performing image capture in the scanning process comprises the step of:

triggering the imaging units at a fixed pitch in the scanning process to synchronously capture the images.

10. A multi-line laser three-dimensional imaging system based on a random lattice, comprising:

a random lattice laser light source, a multi-line laser light source, a high-reflection mirror, a rotating mechanism, an image capture unit, a core control unit, and a data processing unit, wherein the random lattice laser light source is configured to project a random lattice pattern on a surface of an object;

wherein laser light emitted from the multi-line laser light source is reflected by the high-reflection mirror to the surface of the object, an emission center of the light source coinciding with a center of the high-reflection mirror and the number of laser beams emitted being greater than or equal to 3;

wherein the rotating mechanism is configured to drive the high-reflection mirror to rotate a ta certain speed, such that laser lines pan and scan on the surface of the object;

wherein the image capture unit is configured to capture images of the object to obtain a background image containing a lattice pattern and object images $P_1$, $P_2, \ldots,$ and $P_n$ containing lattice patterns and laser lines, the image capture unit comprising at least one imaging unit, an optical axis center of the imaging unit being on a same plane as the emission center of the multi-line laser light source;

wherein the core control unit comprises a power management module, a communication module, and a control module, the power management module being configured to supply power to the system, the communication module being configured to support communications between other functional components in the system and the data processing unit, and the control module being configured to control laser projection of the random lattice laser light source and the multi-line laser light source, and to control the rotating mechanism to rotate to drive the high-reflection mirror to rotate at a certain speed; and wherein the data processing unit is configured to perform sub-pixel extraction on the laser lines in all the object images, to determine a line sequence position of each of the laser lines in the object images $P_2, \ldots,$ and $P_n$ by area-based matching, and to generate point cloud data by calculating using a triangulation measurement principle according to sub-pixel coordinates of each point on the laser line whose line sequence position is determined in the object images $P_1, P_2, \ldots,$ and $P_n$, such that three-dimensional reconstruction is performed on the object.

11. The multi-line laser three-dimensional imaging system according to claim 10, further comprising: another image capture unit.

12. The multi-line laser three-dimensional imaging system according to claim 10, wherein the image capture unit is further configured to trigger the imaging units at a fixed pitch in the scanning process to synchronously capture the images.

* * * * *